(12) United States Patent
Finot et al.

(10) Patent No.: US 7,350,987 B2
(45) Date of Patent: Apr. 1, 2008

(54) OPTICAL PACKAGE FIBER PASS-THROUGH TO REDUCE CURVATURE OF OPTICAL FIBER DURING THREADING

(75) Inventors: Marc A. Finot, Palo Alto, CA (US); Xiaowei Yao, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 34 days.

(21) Appl. No.: 10/262,356

(22) Filed: Sep. 30, 2002

(65) Prior Publication Data

US 2004/0062494 A1    Apr. 1, 2004

(51) Int. Cl.
G02B 6/36    (2006.01)

(52) U.S. Cl. ............................................ 385/94; 385/88
(58) Field of Classification Search ............ 385/88–94, 385/52, 136–137, 49, 14, 131
See application file for complete search history.

(56) References Cited

U.S. PATENT DOCUMENTS

| | | | | |
|---|---|---|---|---|
| 4,399,541 A * | 8/1983 | Kovats et al. | ................. | 372/36 |
| 4,479,698 A * | 10/1984 | Landis et al. | ................. | 385/91 |
| 4,708,429 A * | 11/1987 | Clark et al. | .................... | 385/91 |
| 4,752,109 A * | 6/1988 | Gordon et al. | ................. | 385/14 |
| 4,838,639 A * | 6/1989 | Morankar et al. | ............ | 385/86 |
| 5,023,447 A * | 6/1991 | Masuko et al. | ......... | 250/227.24 |
| 5,065,226 A * | 11/1991 | Kluitmans et al. | .......... | 257/433 |
| 5,068,865 A * | 11/1991 | Ohshima et al. | ............... | 372/36 |
| 5,165,002 A * | 11/1992 | Cumberledge et al. | ....... | 385/92 |
| 5,195,102 A * | 3/1993 | McLean et al. | ................ | 372/34 |
| 5,227,646 A * | 7/1993 | Shigeno | ......................... | 257/80 |
| 5,347,603 A * | 9/1994 | Belenkiy et al. | ............... | 385/86 |
| 5,500,911 A * | 3/1996 | Roff | .............................. | 385/33 |
| 5,617,495 A * | 4/1997 | Funabashi et al. | ............. | 385/92 |
| 5,757,997 A * | 5/1998 | Birrell et al. | .................. | 385/60 |
| 5,793,914 A * | 8/1998 | Sasaki | ........................... | 385/49 |
| 6,004,046 A * | 12/1999 | Sawada | ........................ | 385/92 |
| 6,112,002 A * | 8/2000 | Tabuchi | ........................ | 385/50 |
| 6,227,723 B1 * | 5/2001 | Masuda et al. | ................ | 385/88 |
| 6,282,351 B1 * | 8/2001 | Go et al. | ........................ | 385/92 |
| 6,367,988 B1 * | 4/2002 | Auracher et al. | .............. | 385/88 |
| 6,427,046 B1 * | 7/2002 | Bickford et al. | ............. | 385/138 |
| 6,496,524 B2 * | 12/2002 | Miyokawa et al. | ............ | 372/36 |
| 6,585,426 B2 * | 7/2003 | Shuto et al. | ................... | 385/90 |
| 6,608,959 B2 * | 8/2003 | Jang et al. | ................... | 385/136 |
| 6,769,819 B2 * | 8/2004 | Tanaka et al. | ................. | 385/92 |
| 6,807,208 B2 * | 10/2004 | Nasu et al. | ..................... | 372/36 |
| 6,869,231 B2 * | 3/2005 | Chiu et al. | ..................... | 385/93 |

* cited by examiner

*Primary Examiner*—Michael G. Lee
*Assistant Examiner*—Kumiko C. Koyama
(74) *Attorney, Agent, or Firm*—Blakely, Sokoloff, Taylor & Zafman LLP (57) ABSTRACT

Optoelectronic packages with one or more feed-throughs having a cutout allow optical fibers that have been coupled to a component (e.g., an optical component, an electrical component, a structural component) to be fed through more easily than a package having feed-throughs without a cutout. In one embodiment, the cut in the feed-through is on the opposite side of the initial direction of the threading. That is, if the fiber is to come from above the feed-through, the cut is placed on the bottom of the feed-through. The placement of the cut on the feed-through allows a fiber previously attached to a component to be fed through without excessive curvature of the fiber.

27 Claims, 7 Drawing Sheets

OPTICAL PACKAGE FIBER PASS-THROUGH TO REDUCE CURVATURE OF OPTICAL FIBER DURING THREADING

TECHNICAL FIELD

The invention relates to optoelectronic assembly packaging. More specifically, the invention relates to a fiber pass-through that reduces the curvature of a fiber when the fiber is placed in the package.

BACKGROUND

Sealed packages are used to contain, protect and couple to optical fibers and electrically connect optoelectronic components. Optoelectronic packages are difficult and costly to manufacture because submicron alignment between optical elements, high-speed electrical connections, excellent heat dissipation and high reliability are required. Providing these features can be an order of magnitude more costly and/or more expensive than manufacturing electronic packages. Also, current designs of optoelectronic packages and associated manufacturing processes are ill adapted for automation because current high-performance butterfly packages are characterized by a large number of parts (e.g., submounts, brackets, ferrules), three-dimensional alignment requirements and poor mechanical accessiblity.

One of the difficulties of manufacturing an optoelectronic packages is the coupling of the optical fiber to the optical components, or other structural components, that are either disposed within the package or that will be disposed within the package. If the fiber is coupled to the component after the component is disposed within the package the space available for the mechanics of coupling is limited, which increases the difficulty of the coupling activity. Alternatively, the fiber can be coupled with the component prior to a component being disposed within the package. This can cause difficulty in placing the component within the package because the fiber must be threaded through the feed-through without causing excessive curvature to the fiber. The excess curvature can damage the fiber or disrupt the connection of the fiber to the component.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Optoelectronic packages having a fiber feed-through that reduces the curvature of a fiber when the fiber is placed in the package are described. In the following description, for purposes of explanation, numerous specific details are set forth in order to provide a thorough understanding of the embodiment of the present invention. It will be apparent, however, to one skilled in the art that the embodiment of the invention can be practiced without these specific details. In other instances, structures and devices are shown in block diagram form in order to avoid obscuring the embodiment of the present invention.

Optoelectronic packages with one or more feed-throughs having a cutout allow optical fibers that have been coupled to a component (e.g., an optical component, an electrical component, a structural component) to be fed through more easily than a package having feed-throughs without a cutout. In one embodiment, the cut in the feed-through is on the opposite side of the initial direction of the threading. That is, if the fiber is to come from above the feed-through, the cut is placed on the bottom of the feed-through. The placement of the cut on the feed-through allows a fiber previously attached to a component to be fed through without excessive curvature of the fiber.

Figure 1:
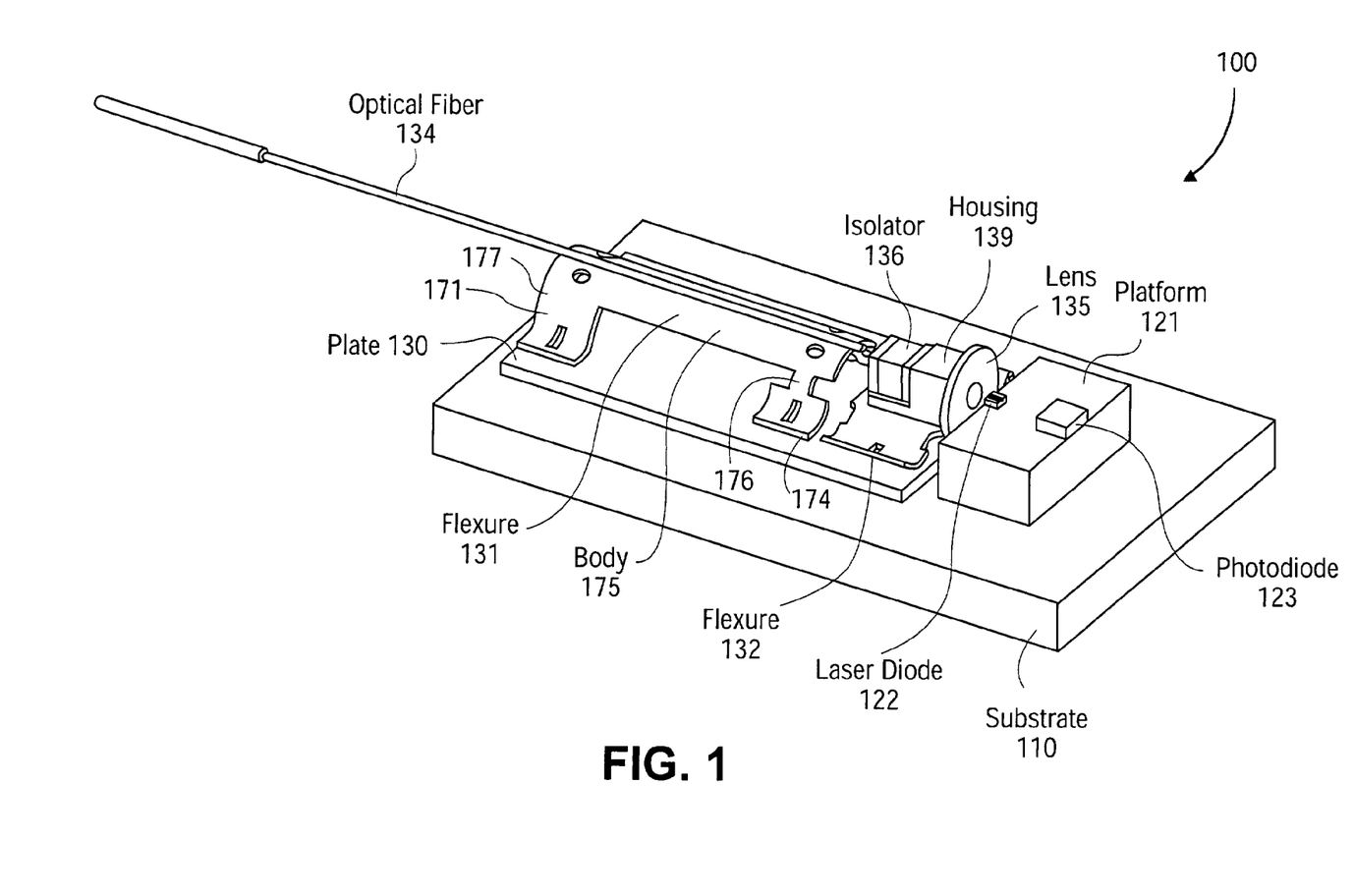
FIG. 1 illustrates one embodiment of an optoelectronic assembly.

FIG. 1 is one embodiment of an optoelectronic assembly. In general, optoelectronic assembly 100 includes substrate 110 with raised platform 121 (e.g., a riser) and plate 130 (e.g., welding plate, bonding plate). In one embodiment, platform 121 and plate 130 are substantially planar. Platform 121 and plate 130 can be attached to substrate 110, for example, by soldering or brazing, or can even be part of the substrate material. Platform 121 can be a high thermal conductivity material, for example, copper, tungsten, Aluminum Nitride, Berillyum Oxide, Diamond, or Boron Nitride.

Laser diode 122 and photodiode 123 can be coupled to the top of platform 121. Photodiode 123 monitors light emitted by back facets of laser diode 122. In an alternative embodiment, where optoelectronic assembly 100 is a receiver, photodiode 123 would replace laser diode 122 on platform 122 and isolator 136 would be eliminated.

Flexure 131 and flexure 132 are coupled to plate 130. Optical fiber 134 is coupled to flexure 131 by, for example, soldering, brazing or welding. In one embodiment, flexure 131 has four legs (e.g., 171 and 174), body 175 monopost flexing spring regions 176 on each side of body 175, and bipost flexing spring regions 177 on each side of body 175. Flexures are described in greater detail in U.S. Pat. No. 6,207,950, entitled "An Optoelectronic Assembly Having a Flexure for Maintaining Alignment Between Optical Elements," issued Mar. 27, 2001 and U.S. patent application Ser. No. 09/885,240 entitled, "A Flexure," filed Jun. 19, 2001. Other flexure assemblies can also be used.

Flexure 132 includes a housing 139 that supports a lens 135 and an isolator 136, which are coupled thereto. Optical fiber 134, lens 135, isolator 136 and laser diode 122 are optically aligned along the same optical axis.

Figure 2:
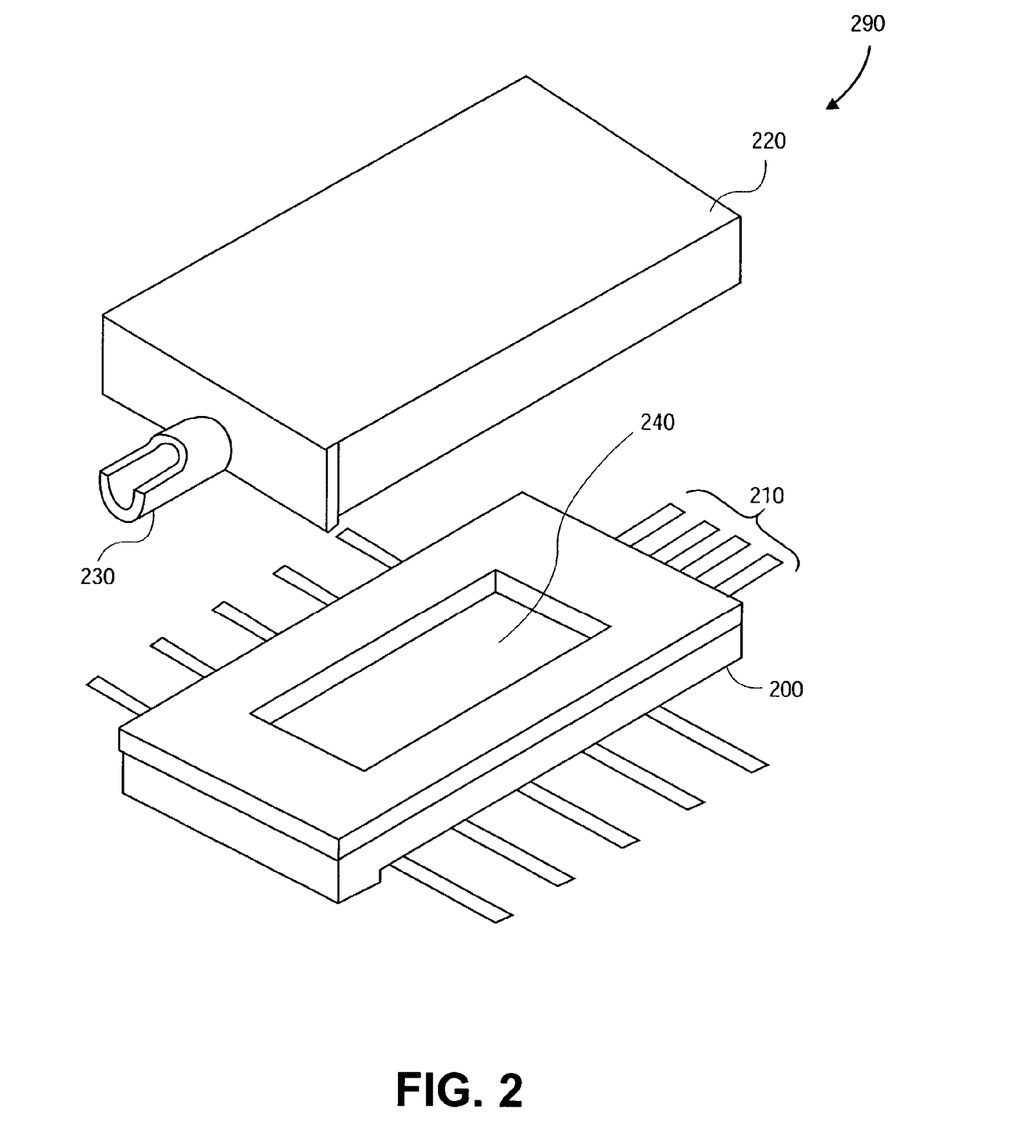
FIG. 2 illustrates one embodiment of a butterfly can package having a pass-through with a cutout on an upper portion of the package.

FIG. 2 illustrates one embodiment of a butterfly can package having a pass-through with a cutout on an upper portion of the package. The embodiment of FIG. 2 is illustrated with a butterfly can package, the pass-through described can be used with other types of optoelectronic packages. The butterfly can package of FIG. 2 also includes components electrical and/or optical components, which are not illustrated for reasons of simplicity of description.

Package 290 includes bottom portion 200 and upper portion 220. Package 290 also includes substrate 240, which can be any type of substrate known in the art appropriate for use with optical packaging to provide support for components within package 290. Pins/leads 210 provide an interface through which electrical signals are passed into and/or out of package 290.

In one embodiment, upper portion 220 includes pass-through 230, which provides a portal through which an optical fiber (not shown in FIG. 2) can pass to carry optical signals to/from a device within package 290. Pass-through 230 includes a cutout section that allows fibers to be passed through without being substantially parallel to the axis of pass-through 230.

Figure 4A:
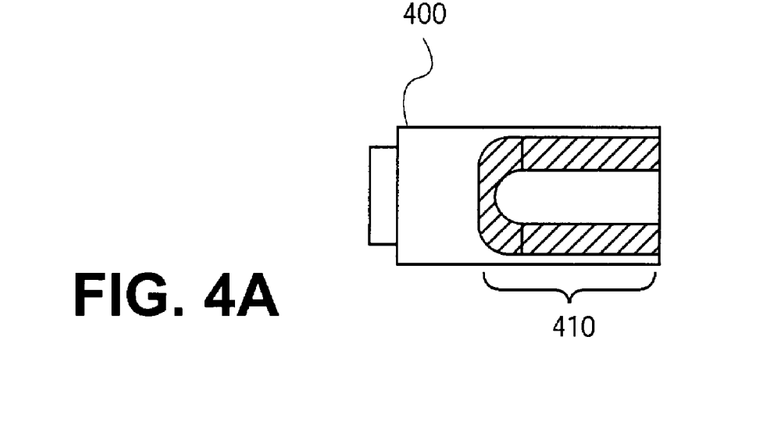
FIG. 4a illustrates a top view of one embodiment of a pass-through with a cutout.
Figure 4B:
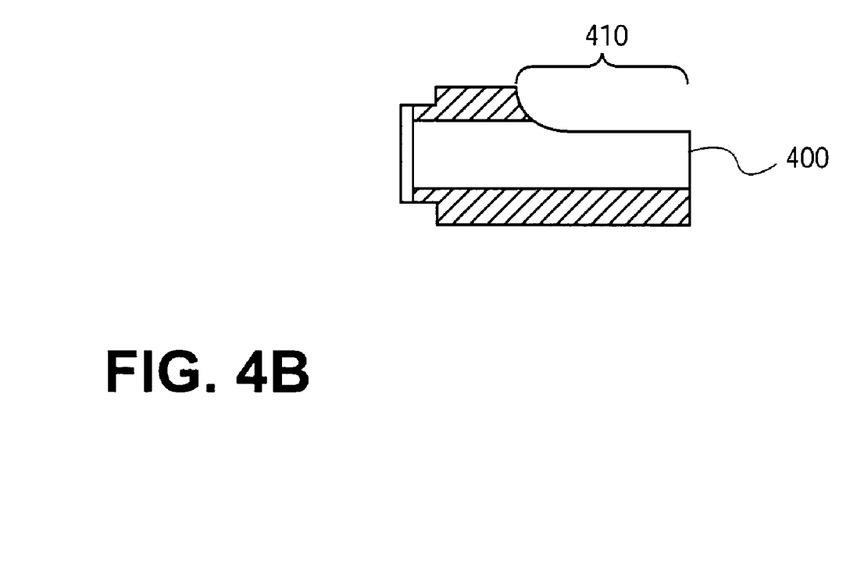
FIG. 4b illustrates a side cutaway view of one embodiment of a pass-through with a cutout.
Figure 4C:
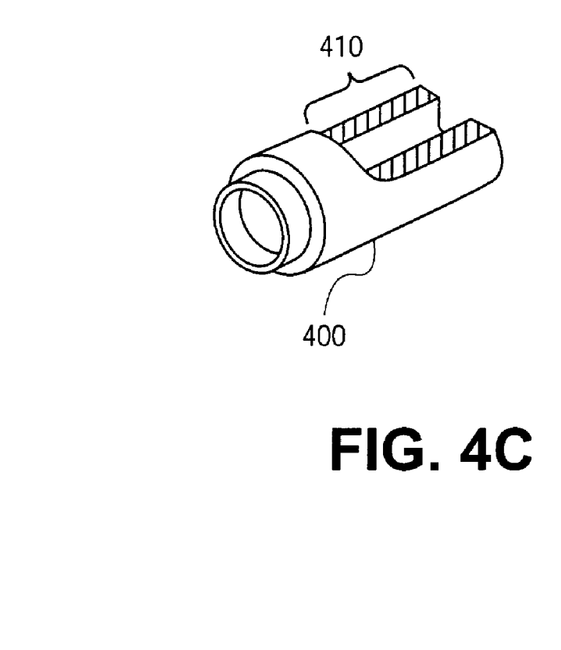
FIG. 4c illustrates a perspective view of one embodiment of a pass-through with a cutout.

Various views of one embodiment of a pass-through are illustrated in FIGS. 4a through 4c. Other cutout shapes can also be used. In general, a cutout is a portion of an otherwise cylindrical pass-through that has been removed. The cutout can be removed from a cylindrical pass-through or the pass-through can be cast (or otherwise manufactured) with the cutout included in the design.

In the embodiment of FIG. 2, optical, electronic and/or structural components (not shown in FIG. 2) are mounted to substrate 240. An optical fiber coupled to the one or more components is threaded through feed-through 230 by angling upper portion 220 so that the fiber passes through the cutout portion of pass-through 230. Upper portion 220 can then be aligned with lower portion 220 and sealed to provide a hermetic package for the components within package 290.

Because the cutout of pass-through 230 provides a larger area for the fiber to pass through as compared to a traditional pass-through without a cutout, the curvature of the optical fiber during threading through pass through 230 is reduced. The larger open area in pass-through 230 also simplifies the threading because the alignment is not required to be as precise as compared to traditional pass-throughs.

Figure 3:
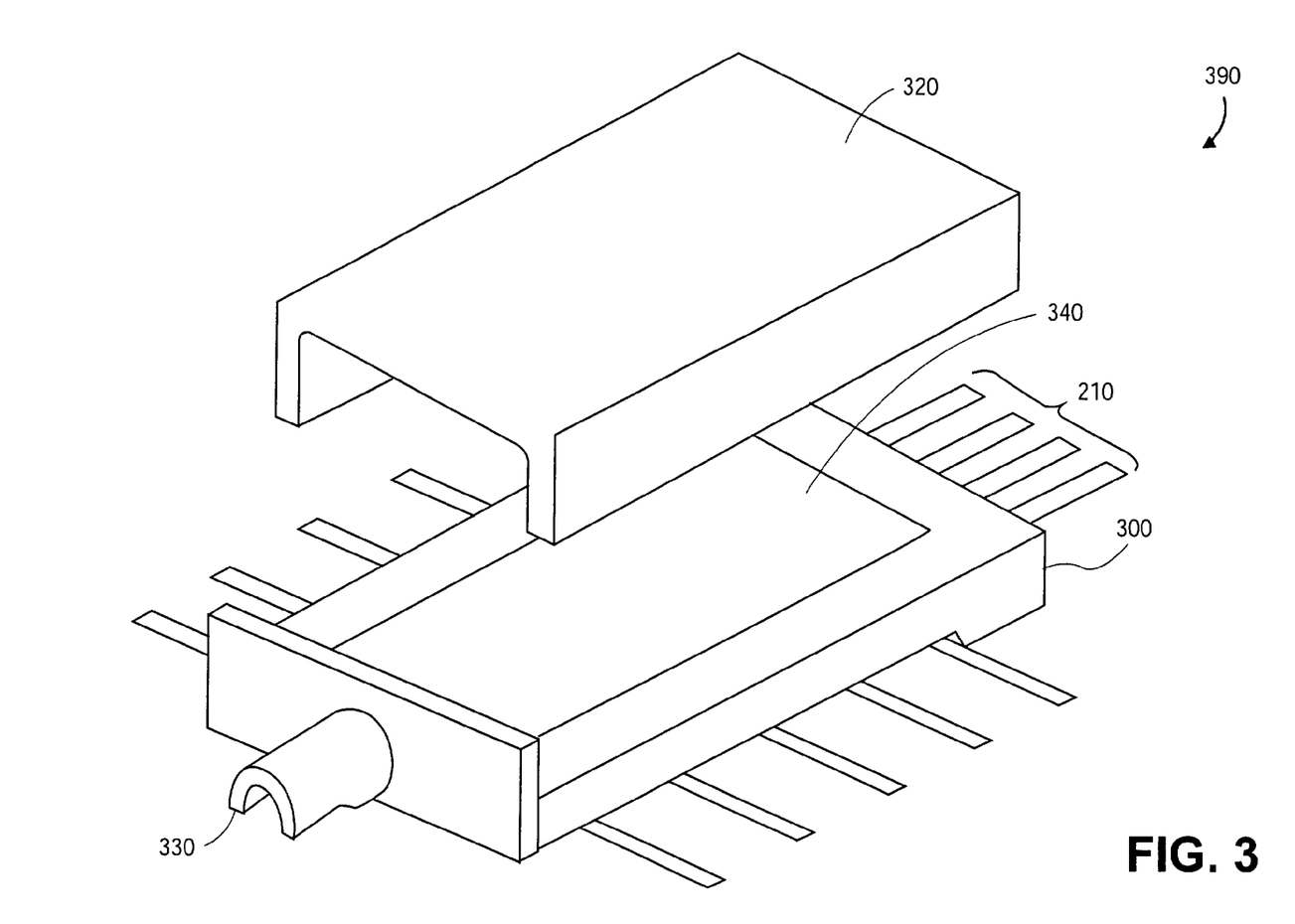
FIG. 3 illustrates one embodiment of a butterfly can package having a pass-through with a cutout on a lower portion of the package.

FIG. 3 illustrates one embodiment of a butterfly can package having a pass-through with a cutout on a lower portion of the package. Package 390 is similar to the package of FIG. 2 except that pass-through 330 is part of lower portion 300, rather than the upper portion as described with respect to FIG. 2.

In the embodiment of FIG. 3, an optical fiber is coupled with a structural component (e.g., a flexure, a support) to be housed in package 390. The fiber is fed through pass-through 330 at an angle such that the fiber passes through the cutout of pass-through 330. The component is then mounted to substrate 340 and upper portion 320 is aligned with lower portion 300. Upper portion 320 and lower portion 300 are sealed to provide a hermetic package.

FIGS. 4a through 4c illustrate various views of one embodiment of a pass-through with a cutout. FIG. 4a illustrates a top view of one embodiment of a pass-through with a cutout. Pass-through 400 includes cutout 410 indicated by hatching in FIG. 4a.

FIG. 4b illustrates a side cutaway view of one embodiment of a pass-through with a cutout. In FIG. 4b, the hatching indicates the walls of pass-through 400. FIG. 4c illustrates a perspective view of one embodiment of a pass-through with a cutout. As with FIG. 4a, FIG. 4c indicates the cutout with hatching.

Figure 5:
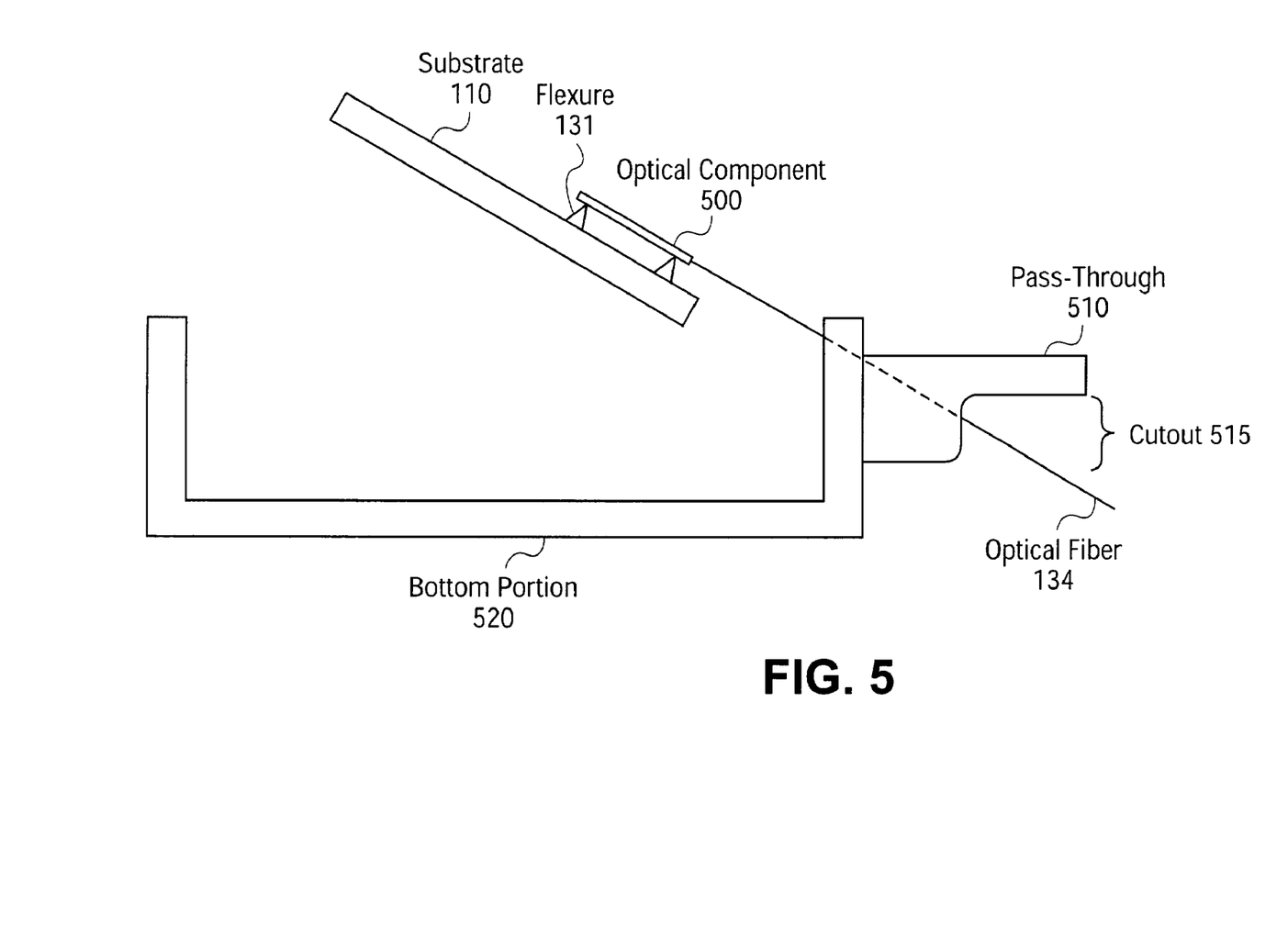
FIG. 5 illustrates a structural component (e.g., a flexure) with an optical fiber attached where the optical fiber is threaded through a pass-through having a cutout on a bottom portion of a package.

FIG. 5 illustrates a structural component (e.g., a flexure) with an optical fiber attached where the optical fiber is threaded through a pass-through having a cutout on a bottom portion of a package. In order to thread optical fiber 134, which has been attached to optical component 500. In one embodiment, optical component 500 is connected to substrate 110 by flexure 131; however, other attachment techniques can also be used.

In order to place substrate 110 into bottom portion 520, optical fiber 134 is threaded through pass-through 510. Because pass-through 510 includes cutout 515, the angle between bottom portion 520 and substrate 110 when optical fiber 134 is threaded can be greater than if pass-through 510 did not include cutout 515. Cutout 515 further reduces, or even eliminates, the curvature to optical fiber 134 required during threading of optical fiber 134 through pass-through 510, which decreases the opportunity for damage to the connection between optical fiber 134 and optical component 500 as well as other potential damage.

After optical fiber 134 has been threaded through pass-through 510, substrate 110 can be lowered and attached to bottom portion 520. When substrate 110 is attached to bottom portion 520, optical fiber 134 is generally parallel with the axis of pass through 510. The size and placement of cutout 515 with respect to the ends of pass through 510 can be selected based on, for example, the sizes of substrate 110, bottom portion 520 and pass-through 510.

Figure 7:
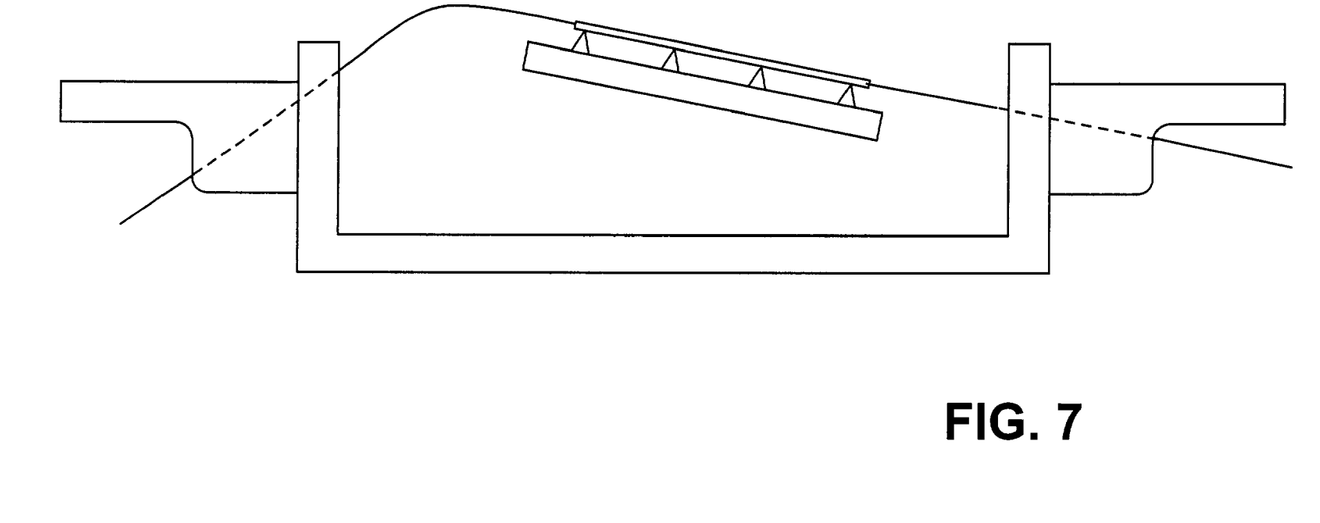
FIG. 7 illustrates a pair of structural components (e.g., flexures) with optical fibers attached where each optical fiber is threaded through a pass-through having a cutout on a bottom portion of a package.

After optical fiber 134 has been threaded through pass-through 510, a top portion (not shown in FIG. 5) can be attached to bottom portion 520 to provide a sealed optoelectronic package. In an alternate embodiment, bottom portion 520 can have multiple pass-throughs, one or more of which may have cutouts. For example, substrate 110 can have an additional component (optical, structural, electrical, etc.) opposite component 500. An optical fiber connected to the additional component can be threaded through a feed through opposite pass through 510. FIG. 7 illustrates a pair of structural components (e.g., flexures) with optical fibers attached where each optical fiber is threaded through a pass-through having a cutout on a bottom portion of a package. Thus, both optical fibers can be threaded at the same time with reduced curvature caused to the fibers during threading.

Figure 6:
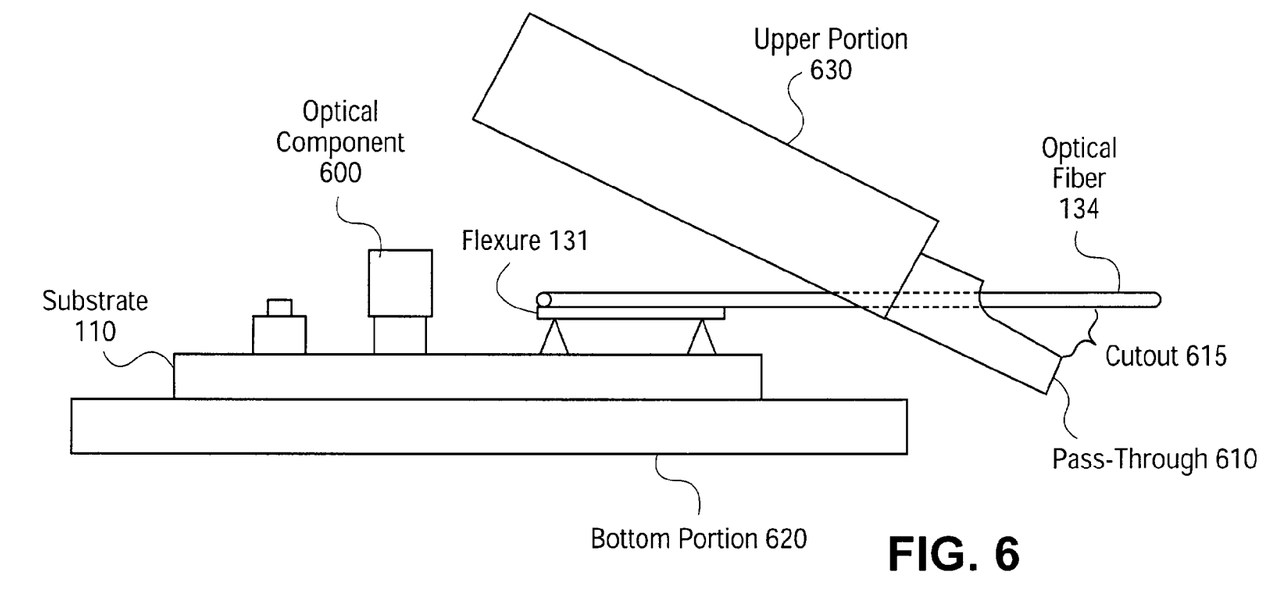
FIG. 6 illustrates a structural component with an optical fiber attached where the optical fiber is being fed through a pass-through having a cutout on an upper portion of a package.

FIG. 6 illustrates a structural component with an optical fiber attached where the optical fiber is being fed through a pass-through having a cutout on an upper portion of a package. Optical fiber 134 is connected to substrate 110 by flexure 131. Optical fiber 134 is optically aligned with, or coupled with, optical component 600. Substrate 110 is connected to bottom portion 620.

To connect upper portion 630 with bottom portion 620, upper portion 630, which includes pass-through 610 with cutout 615 is angled so that optical fiber 134 is threaded through cutout 615. Upper portion 630 is then aligned and connected to bottom portion 620.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
a package having an upper portion and a lower portion that, when combined, provide a hermetically sealed package for components disposed within an enclosed cavity formed between the upper portion and the lower portion; and
a pass-through connected with the package to allow an optical fiber to pass in to the package, the pass-through having a cutout external to the package, the cutout to receive the optical fiber at an angle such that the optical fiber is non-parallel to a longitudinal axis of the pass-through when a plane of the upper portion of the package is at a non-zero angle with respect to a plane of the lower portion of the package, and wherein the pass-through receives the optical fiber such that the optical fiber is substantially concentric to the longitudinal axis of the pass-through when the plane of the upper portion of the package is substantially parallel to the plane of the lower portion of the package;
wherein the pass-through includes a wall forming a generally cylindrical shape and the cutout provides an opening in the wall, wherein the opening is generally perpendicular to the longitudinal axis and extends to a distal end of the pass-through.

2. The apparatus of claim 1 wherein the pass-through is connected to the upper portion of the package.

3. The apparatus of claim 1 wherein the pass-through is connected to the lower portion of the package.

4. The apparatus of claim 1 further comprising a component disposed within the package.

5. The apparatus of claim 4 further comprising an optical fiber coupled with the component and disposed within the pass-through.

6. The apparatus of claim 5 wherein the optical fiber comprises a gold-plated optical fiber.

7. The apparatus of claim 1 wherein the package comprises a double-sided butterfly cam.

8. The apparatus of claim 1 further comprising a second pass-through having a cutout generally perpendicular to the longitudinal axis of the pass-through.

9. The apparatus of claim 1, wherein the optical fiber is disposed along the center line of the pass-through after threading the optical fiber aligned with an optical device within the package.

10. A system comprising:
a first component having a package with an upper portion and a lower portion that, when combined, provide a hermetically sealed package, an optical device disposed within an enclosed cavity formed between the upper portion and the lower portion, and a pass-through connected with the package to allow an optical fiber coupled with the optical device to pass in to the package, the pass-through having a cutout external to the package, the cutout to receive the optical fiber at an angle such that the optical fiber is non-parallel to a longitudinal axis of the pass-through when a plane of the optical device is at a non-zero angle with respect to a plane of the lower portion of the package, and wherein the pass-through receives the optical fiber such that the optical fiber is substantially concentric to the longitudinal axis of the pass-through when the plane of the optical component is substantially parallel to the plane of the lower portion of the package, wherein the pass-through includes a wall forming a generally cylindrical shape and the cutout provides an opening in the wall, wherein the opening is generally perpendicular to the longitudinal axis and extends to a distal end of the pass-through; and
a second component coupled with the first component to communicate optical signals with the first component.

11. The system of claim 10 wherein the pass-through is connected to the upper portion of the package.

12. The system of claim 10 wherein the pass-through is connected to the lower portion of the package.

13. The system of claim 10 wherein the optical fiber comprises a gold-plated optical fiber.

14. The system of claim 10 wherein the first component comprises a network interface.

15. A method comprising:
coupling an optical fiber to a component to be disposed within an enclosed cavity formed between an upper portion and a lower portion of a package;
positioning the upper portion and lower portion of the package such that a plane of the upper portion of the package is at a non-zero angle with respect to a plane of the lower portion of the package;
threading the optical fiber through a cutout of a pass-through at an angle such that the optical fiber is non-parallel to a longitudinal axis of the pass-through when the plane of the upper portion of the package is at the non-zero angle with respect to the plane of the lower portion of the package, wherein the pass-through includes a wall forming a generally cylindrical shape and the cutout provides an opening in the wall, wherein the opening is generally perpendicular to the longitudinal axis and extends to a distal end of the pass-through; and
positioning the upper portion and the lower portion of the package such that the plane of the upper portion of the package is substantially parallel to the plane of the lower portion of the package, wherein the optical fiber is substantially concentric to the longitudinal axis of the pass-through when the plane of the upper portion of the package is substantially parallel to the plane of the lower portion of the package.

16. The method of claim 15 wherein threading the optical fiber through the pass-through comprises:
positioning the component at a nonlinear angle with respect to the lower portion of the package to which the pass-through is connected; and
passing the optical fiber through the cutout in the pass-through at an angle such that the optical fiber is non-parallel to the longitudinal axis of the pass-through.

17. The method of claim 16 further comprising positioning the component on the bottom portion of the package such that the optical fiber passes through the pass-through and optical fiber is approximately parallel to the longitudinal axis of the pass-through.

18. The method of claim 15 wherein threading the optical fiber through the pass-through comprises:
positioning the upper portion of the package to which the pass-through is connected at an angle with respect to the component; and
passing the optical fiber through the cutout in the pass-through at an angle with respect to the longitudinal axis of the pass-through.

19. The method of claim 18 further comprising positioning the upper portion of the package over the component such that the optical fiber passes through the pass-through and optical fiber is approximately parallel to the longitudinal axis of the pass-through.

20. The method of claim 15 wherein the optical fiber comprises a gold-plated optical fiber.

21. An apparatus, comprising:
a package having an upper portion and a lower portion, the package having a first position and a second position, the first position including the upper portion and the lower portion positioned such that a plane of the upper portion is non-parallel to a plane of the lower portion, the second position including the upper portion and the lower portion positioned such that the plane of the upper portion is substantially parallel to the plane of the lower portion and wherein the second position includes the upper portion and the lower portion providing a hermetically sealed package for components disposed within an enclosed cavity formed between the upper portion and the lower portion;
a pass-through having a wall forming a generally right-circular cylindrical shape, the pass through including:
a first end having an annular cross-section coupled to the package to allow an optical fiber to pass in to the enclosed cavity of the package;
a second end having a partially annular cross-section opposite the first end; and
a cutout external to the package, the cutout providing an opening in the wall of the pass-through, wherein the opening is generally perpendicular to a longitudinal axis of the pass-through and extends from an area external to the package to the second end of the pass-through,
wherein the cutout is to receive the optical fiber without passing through the second end of the pass-through and at an angle such that the optical fiber is non-parallel to the longitudinal axis of the pass-through when the package is in the first position, and
wherein the second end of the pass-through is to receive the optical fiber without passing through the cutout and at an angle substantially parallel to the longitudinal axis of the pass-through when the package is in the second position.

22. The apparatus of claim 21 wherein the pass-through is coupled to the upper portion of the package.

23. The apparatus of claim 21 wherein the pass-through is coupled to the lower portion of the package.

24. The apparatus of claim 21 further comprising a component disposed within the enclosed cavity of the package.

25. The apparatus of claim 24 further comprising an optical fiber coupled with the component and disposed within the pass-through.

26. The apparatus of claim 25 wherein the optical fiber comprises a gold-plated optical fiber.

27. The apparatus of claim 21 wherein the package is a double-sided butterfly can.

* * * * *